United States Patent
Simpson et al.

(10) Patent No.: US 11,048,791 B2
(45) Date of Patent: Jun. 29, 2021

(54) DIGITALLY SIGNED DATA

(71) Applicant: HEWLETT-PACKARD DEVELOPMENT COMPANY, L.P., Spring, TX (US)

(72) Inventors: Shell S. Simpson, Boise, ID (US); Jefferson P. Ward, Vancouver, WA (US); Stephen D. Panshin, Corvallis, OR (US); David B. Novak, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 283 days.

(21) Appl. No.: 16/316,306

(22) PCT Filed: Aug. 3, 2016

(86) PCT No.: PCT/US2016/045279
§ 371 (c)(1),
(2) Date: Jan. 8, 2019

(87) PCT Pub. No.: WO2018/026360
PCT Pub. Date: Feb. 8, 2018

(65) Prior Publication Data
US 2020/0117793 A1    Apr. 16, 2020

(51) Int. Cl.
*G06F 21/00* (2013.01)
*G06F 21/44* (2013.01)
(Continued)

(52) U.S. Cl.
CPC .............. *G06F 21/44* (2013.01); *G06F 21/57* (2013.01); *G06F 21/73* (2013.01); *H04L 9/3247* (2013.01)

(58) Field of Classification Search
CPC .......... G06F 21/44; G06F 21/57; G06F 21/73; H04L 9/3247
See application file for complete search history.

(56) References Cited

U.S. PATENT DOCUMENTS 7,395,963 B2 *  7/2008  Silverbrook ......... G06Q 20/401
                                                    235/385
8,621,212 B2    12/2013  Lim et al.
(Continued)

FOREIGN PATENT DOCUMENTS

CN    101036152 A    9/2007
CN    101894331 A    11/2010
(Continued)

OTHER PUBLICATIONS

"Print Cartridge Authentication"; 2016; Maxim Integrated; https://www.maximintegrated.com/en/products/digital/one-wire/print-cartidge-id.html.

*Primary Examiner* — Ghodrat Jamshidi
(74) *Attorney, Agent, or Firm* — Steven L. Nichols; Fabian VanCott

(57) ABSTRACT

An example print supply includes a non-transitory computer-readable medium. The non-transitory computer-readable medium includes data. The data includes an indication of a schema for the data. The data also includes an indication of an identifier. The data includes an indication of a digital signature. The digital signature is usable to authenticate a type of the data, the schema, and the identifier. The print supply also includes a communication interface. The communication interface is to output the data from the non-transitory computer-readable medium.

20 Claims, 6 Drawing Sheets

(51) Int. Cl.
  *G06F 21/57*     (2013.01)
  *G06F 21/73*     (2013.01)
  *H04L 9/32*      (2006.01)

(56) References Cited

U.S. PATENT DOCUMENTS

| | | | |
|---|---|---|---|
| 8,959,590 B2 | 2/2015 | Huebler et al. | |
| 9,227,417 B2 | 1/2016 | Ignatchenko et al. | |
| 2003/0063311 A1* | 4/2003 | Covitt | B41J 2/17546 |
| | | | 358/1.15 |
| 2006/0098993 A1* | 5/2006 | Yang | G03G 15/0855 |
| | | | 399/12 |
| 2006/0136702 A1* | 6/2006 | Vantalon | G06F 21/606 |
| | | | 713/1 |
| 2006/0140647 A1* | 6/2006 | Adkins | G03G 15/0865 |
| | | | 399/12 |
| 2007/0079125 A1 | 4/2007 | Adkins | |
| 2009/0182997 A1* | 7/2009 | Gillard | G11B 20/00884 |
| | | | 713/153 |
| 2010/0241852 A1 | 9/2010 | Rotem | |
| 2011/0093510 A1* | 4/2011 | Beck | H04L 9/3247 |
| | | | 707/803 |
| 2012/0134687 A1* | 5/2012 | Jones | G03G 15/0863 |
| | | | 399/12 |
| 2013/0083096 A1* | 4/2013 | Rice | B41J 2/1753 |
| | | | 347/2 |
| 2013/0290360 A1* | 10/2013 | Cunningham | G06F 16/211 |
| | | | 707/758 |
| 2014/0281554 A1 | 9/2014 | Maletsky | |
| 2016/0082740 A1 | 3/2016 | Jeran | |
| 2016/0154957 A1* | 6/2016 | Jeran | G06F 21/44 |
| | | | 713/176 |
| 2016/0234064 A1* | 8/2016 | Sirpal | G06F 3/0486 |

FOREIGN PATENT DOCUMENTS

| | | |
|---|---|---|
| CN | 102173233 | 9/2011 |
| CN | 101099157 B | 1/2012 |
| TW | 201040783 A | 11/2010 |
| WO | WO-2006073702 | 7/2006 |

* cited by examiner

DIGITALLY SIGNED DATA

BACKGROUND

Proper functioning of a manufactured product or other products interfacing with that manufactured product may depend on the authenticity of the manufactured product. For example, the manufactured product may include settings to be used by another product with which the manufactured product interfaces. The other product may be damaged if the manufactured product provides improper settings. In addition, a warranty of the other product may be affected by whether an authentic manufactured product is used with the other product. Accordingly, authenticity of the manufactured product may be verified to determine whether the manufactured product is an authorized product that will provide appropriate settings.

DETAILED DESCRIPTION

A manufactured product may include digitally signed information usable to authenticate the manufactured product. In an example, the manufactured product may interface with a computing system. The computing system may communicate digitally signed information to a remote server, which may authenticate the digitally signed information. Alternatively, or in addition, the computing system may authenticate the digitally signed information. In some examples, the product may be a consumable that is to interface with another product. The consumable may include the digitally signed information, and the product that receives the consumable may include the computing system. The computing system may verify the digitally signed information received from the consumable or communicate the digitally signed information to a server.

In an example, a single, central authority may manage all of the keys for digitally signing information. For example, multiple manufacturers may produce products, consumables compatible with a product, or the like. The central authority may assign keys to the manufacturers. In an example with asymmetric keys, the central authority may provide private keys to the manufacturers for producing the digitally signed information in the manufactured products. The central authority may also store all of the public keys used to verify the digitally signed information in the manufactured products.

The manufacturers may include a unique identifier in the information digitally signed. In an example, each product may be intended to include a unique identifier that is distinct from that included in any other product. The unique identifier may allow products manufactured at different times or by different manufacturers to be distinguished from each other. In some example, the unique identifiers may be reused, and authenticity of the manufactured product may be determined based on whether the unique identifier has been detected previously. In an example, the central authority may assign ranges of unique identifiers to be used by the manufacturers. Assigning ranges to the manufacturers may prevent different manufacturers from accidentally assigning the same identifier to multiple products. However, management of keys and unique identifiers by the central authority may be cumbersome for the central authority as well as the individual manufacturers. The manufacturers may have to rely on the central authority to provide public keys to anyone that is to verify the digitally signed information. Accordingly, the authenticating of manufactured products including digitally signed information would be improved by allowing for authentication without requiring a central authority to assign keys and unique identifiers to manufacturers.

Figure 1:
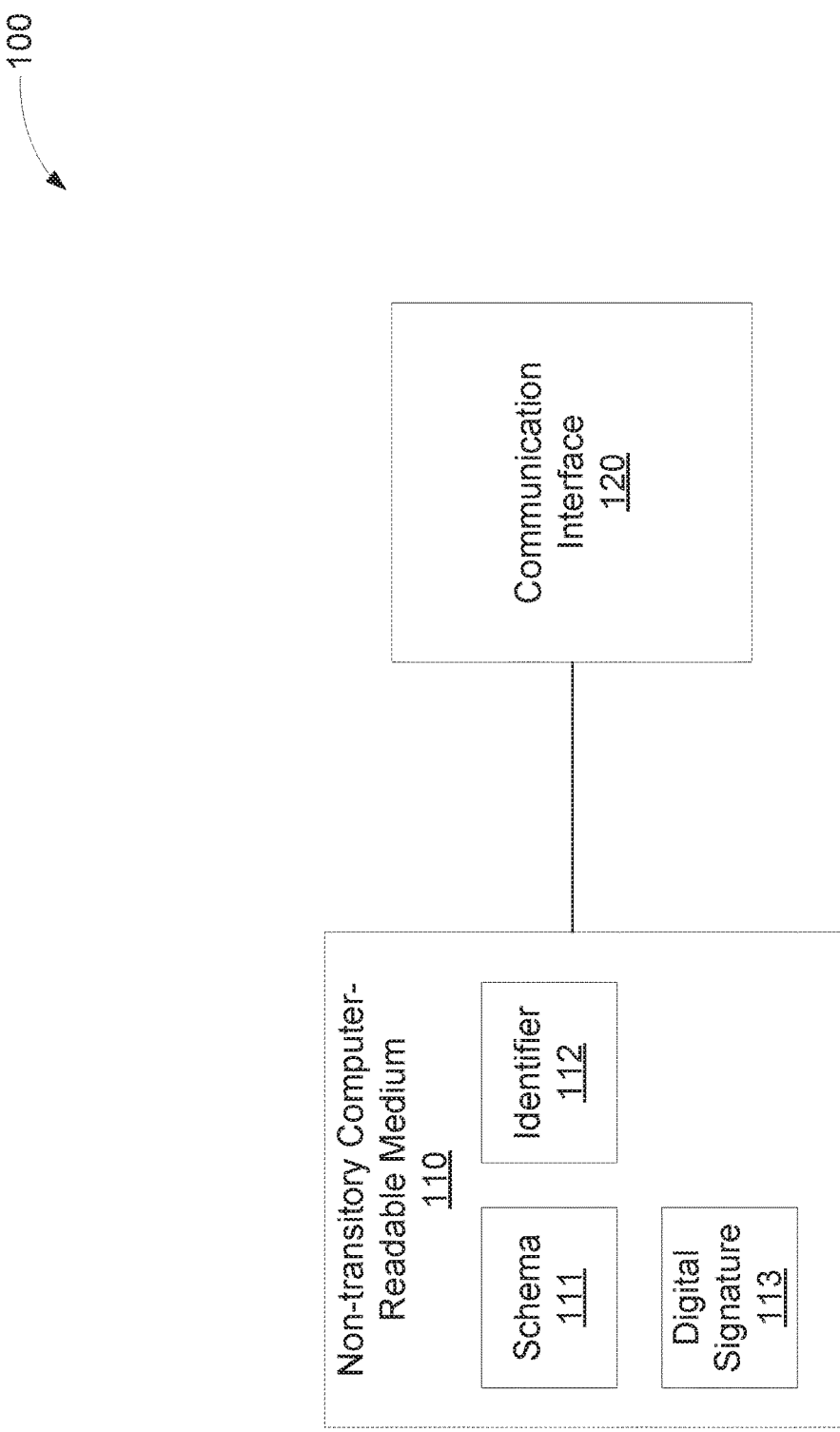
FIG. 1 is a block diagram of an example authenticatable manufactured product to provide digitally signed information.

FIG. 1 is a block diagram of an example authenticatable manufactured product 100 to provide digitally signed information. In an example, the authenticatable manufactured product 100 may be a print supply. For example, the print supply may include powder, toner, printing liquid, ink, three-dimensional print agent, or the like. In an example, the print supply may include a replaceable printer part, such as a fuser. The authenticatable manufactured product 100 may include a non-transitory computer-readable medium 110. As used herein, the term non-transitory computer-readable medium is defined broadly and consists of all computer-readable medium patent eligible under 35 U.S.C. § 101. For example, the non-transitory computer-readable medium may include a volatile computer readable medium (e.g., volatile random access memory (RAM), a processor cache, a processor register, etc.), a non-volatile computer readable medium (e.g., a magnetic storage device, an optical storage device, a paper storage device, flash memory, read-only memory, non-volatile RAM, etc.), or the like. In an example, the non-transitory computer-readable medium may include logic to output a particular value without storing that value directly in a storage device. Rather, some or all of the information content may be contained in the arrangement of the logic. In an example, the logic may be indistinguishable from a storage device to an interface communicating with the logic. The non-transitory computer-readable medium may include storage only, logic only, a combination of storage and logic, or the like.

In an example, the non-transitory computer-readable medium 110 may comprise data. As used herein, the term "data" refers to information content contained in the non-transitory computer-readable medium 110 regardless of whether that information content is stored as a set of bits in the non-transitory computer-readable medium 110 or contained in the configuration of logic in the non-transitory computer-readable medium 110. The data may include an indication of a schema for the data 111. The schema may indicate the layout for the data. As used herein, the term "indication" refers to information content corresponding to what is being indicated regardless of the form of that information content.

The data may also include an indication of an identifier 112. The identifier may identify the authenticatable manufactured product, an entity associated with the authenticatable manufactured product, data associated with the authenticatable manufactured product, or the like. The data may also include an indication of a digital signature 113. The digital signature 113 may be usable to authenticate a type of the data, the schema, the indication of the identifier, etc. For example, the digital signature 113 may include data that is computationally difficult to produce without access to a key. The type of the data may provide domain separation.

The authenticatable manufactured product 100 may include a communication interface 120. The communication interface 120 may output the data from the non-transitory computer readable medium 110. As used herein, the term "communication interface" refers to hardware or software to modulate or demodulate a signal. Modulation or demodulation may include baseband modulation or demodulation. The signal may be transmitted or received in serial or parallel over a wire, wirelessly, or the like.

Figure 2:
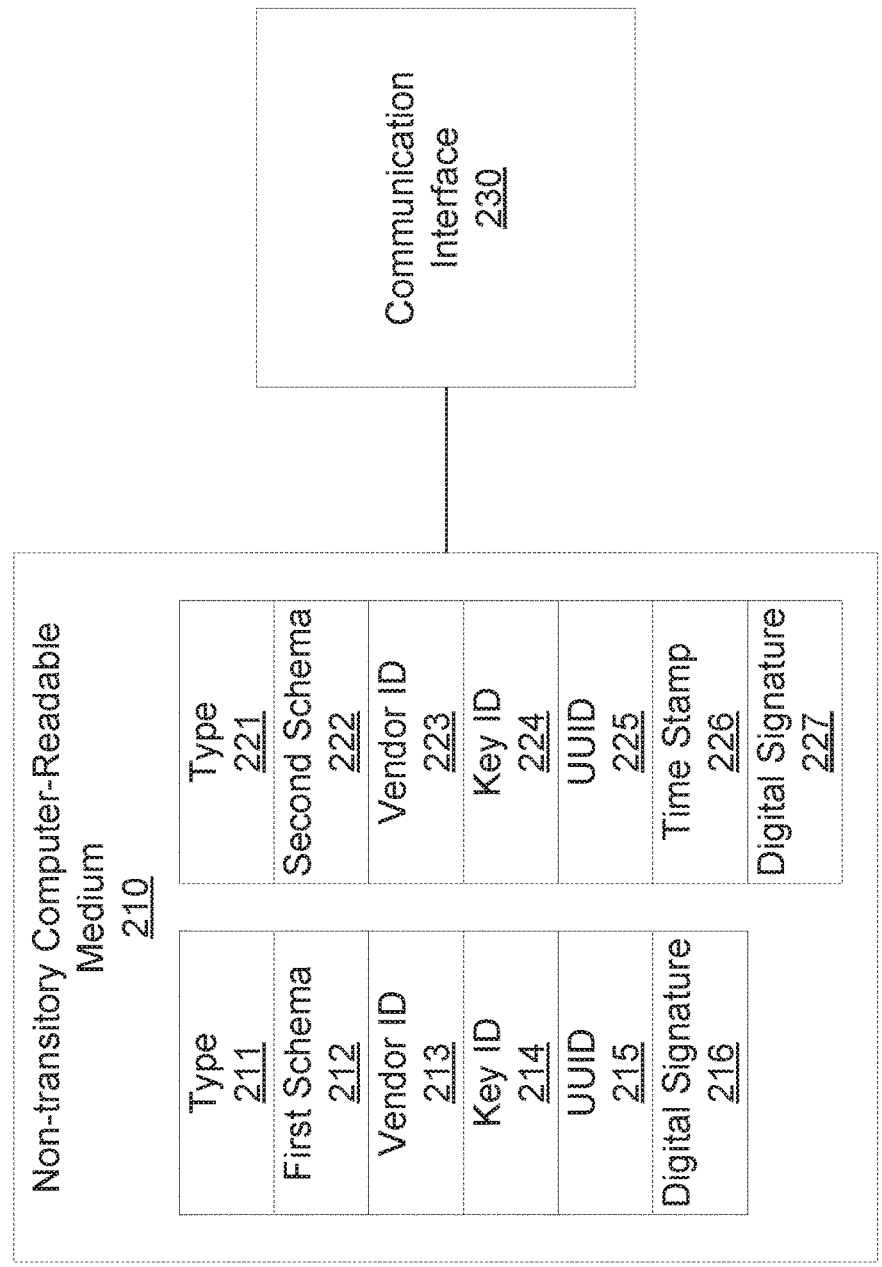
FIG. 2 is a block diagram of another example authenticatable manufactured product to provide digitally signed information.

FIG. 2 is another example authenticatable manufactured product 200 to provide digitally signed information. In an example, the authenticatable manufactured product 200 may include a consumable, such as a print consumable (e.g., printing fluid, a fuser, or the like). The authenticatable manufactured product 200 may include a non-transitory computer-readable medium 210. The non-transitory computer-readable medium 210 may comprise data usable to verify the authenticatable manufactured product 200 is authentic.

The data may include an indication of a type of the data 211. The type may provide domain separation among different types of products, specify an intended use of the data, or the like. For example, several types of products may use similar schemas or similar size schemas for authentication. In addition, there may be several entities that can potentially verify the data (e.g., for a consumable, the entity may be a printer, a server of the printer manufacturer, a server of the consumable manufacturer, a third party, etc.). The type may ensure that data from one type of product, intended use, etc. cannot be substituted for another type of product or intended use. The type may also prevent collisions between signatures generated for different types of products, intended uses, etc. when the data to be signed might be identical were it not for the type. In the illustrated example, the data included in the non-transitory computer-readable medium 210 may include the indication of the type 211. However, in other examples, the data may not include the indication of the type 211. The entities generating and verifying the digital signature may compute/verify the digital signature over the type, but the type may not be included in the non-transitory computer-readable medium or communicated between the generating and verifying entities. The type may be known in advance by the generating and verifying entities.

The data may include an indication of a schema for the data 212. In an example, the indication of the schema 212 may include a value that corresponds to a predetermined schema rather than including a full description of the schema in the indication of the schema 212. The schema may specify the layout, size, etc. of the data (e.g., of the remainder of the data after the type and schema). By including the type and schema, the data may be self-describing. The layout and compatibility of the data may be determined quickly just from reading the type or schema. Because the schema is explicitly indicated, the schema can vary in different versions of the authenticatable manufactured product 200. The indication of the schema 212 may indicate which particular schema is being used in each authenticatable manufactured product.

The data may include an indication of an identifier associated with an entity that generated a digital signature. In an example, the indication of the identifier associated with the entity that generated the digital signature may be referred to as an indication of a vendor ID 213. For example, the entity that is to verify the data may assign vendor IDs to any entity that is generating data to verify authenticatable manufactured devices. The generating entity may include the indication of the assigned vendor ID 213 in the data. Based on the indication of the vendor ID 213, the verifying entity can determine which generating entity created the data.

The data may include an indication of an identifier associated with a key that generated the digital signature. In an example, the indication of the identifier associated with the key may be referred to as an indication of a key ID 214. For example, the entity that generated the digital signature may have generated a key used to digitally sign the data. The generating entity may have generated multiple keys, so the indication of the key ID 214 may indicate which particular key was used to generate the digital signature. The generating entity may provide the key ID and a corresponding key to the verifying entity. When the verifying entity receives data to be verified, it can use the indication of the vendor ID 213 and the indication of the key ID 214 to determine which key to use to verify the data.

The vendor ID and key ID may simplify management of the verification process by the verifying entity. The verifying entity does not need to be responsible for generating keys and key IDs and securely providing them to the generating entities. The key space does not need to be centrally managed. In an example, asymmetric keys may be used to generate the digital signature. Using the vendor ID and key ID means that the private key does not need to be communicated between the verifying entity and the generating entity. Rather, the public key can be provided to the verifying entity with the key ID without providing the private key. Accordingly, there is less risk of the private key being intercepted by an attacker.

The data may include an indication of an identifier generated according to a universally unique identifier generation process. In an example, the indication of the identifier generated according to a universally unique identifier generation process may be referred to as an indication of a UUID 215. In an example, the generating entity may generate the indication of the UUID 215. The universally unique identifier generation process may randomly or pseudo-randomly select the identifier from a number space large enough that collisions are unlikely to occur. In an example, the universally unique identifier generation process may select the identifier according to version 4 of Request for Comment 4122 of the Internet Engineering Task Force and the Internet Society. In some examples, the indication of the UUID 215 may be copied from another authenticatable manufactured product or from a non-transitory computer-readable medium. Accordingly, as used herein, the term "an identifier generated according to a universally unique identifier generation process" refers to an identifier that was generated at some time using the universally unique identifier generation process regardless of how many times the identifier or an indication of the identifier has been copied since then. The indication of the UUID 215 may even have been stored in multiple formats or converted between formats during copying. Indeed, multiple products may include the indication of the UUID 215 due to copying, so the indication of the UUID 215 may not be unique.

The indication of the UUID 215 may be usable to identify copying of the data from an authorized manufactured product to one that has not been authorized. For example, each generating entity may assign a different identifier to each product that it produces. The universally unique identifier generation process may ensure that it is very unlikely that two different generating entities assign the same identifier to different products. Accordingly, products that have not been authorized may be detected based on the same identifier occurring in different products. Thus, the verifying entity may be able to authenticate products without the verifying entity being responsible for managing key identifiers, keys, or unique identifier ranges. Rather, a decentralized process is used to create the data used to authenticate the authenticatable manufactured product 200.

The data may include an indication of a digital signature usable to authenticate the data 216. For example, the digital signature may be computed according to a cryptographic process for which it is computationally difficult to compute a valid digital signature without access to a key. In some examples, the key may be asymmetric, so the digital signature is computed with a private key but can be verified by anyone with a public key. In an example, the cryptographic process may be the Digital Signature Algorithm (DSA), a Federal Information Processing Standard for digital signatures. The digital signature may be computed over the type, the schema, the vendor ID, the key ID, and the UUID. Any variation in one of these elements of the data may result in large variations of the digital signature. Alternatively, or in addition, the data may include fewer than all of the aforementioned elements, or the digital signature may be computed over fewer than all of the aforementioned elements. For example, the generating entity and verifying entity may generate/verify the digital signature over a predetermined set of data different from that illustrated in FIG. 2 (e.g., as specified by the schema). In some examples, the digital signature may be computed dynamically by a secure microcontroller, trusted platform module, or the like based on a private key rather than being precomputed and included in the data. The digital signature may ensure that only approved entities are able to generate the data.

In an example, the non-transitory computer-readable medium 210 may comprise the data in a logically or physically contiguous space. As previously discussed, small changes in data being digital signed may result in large changes to the digital signature. Accordingly, any mistake when aggregating non-contiguous data may result in an incorrect digital signature being produced. By having the data be contiguous, it is much less likely that the generating entity or the verifying entity will make a mistake when computing the digital signature for the data. Alternatively, or in addition, just the data to be signed may be contiguous.

In some examples, some of the data may not be stored on the non-transitory computer-readable medium but rather may be implicitly known by the generating or verifying entities. For example, the type, schema, or the identifier associated with the generating entity may be the same for all consumables used with a particular product or all products authenticated by the verifying entity. Accordingly, the digital signature may be generated based on the type, schema, and the identifier associated with the generating entity, but the type, schema, or the identifier associated with the generating entity may not be stored and may not be communicated from the generating entity to the verifying entity. Rather, the verifying entity may recreate the missing information when it verifies the digital signature.

In some examples, the non-transitory computer-readable medium 210 may include additional data. The additional data may include an indication of a second type 221, an indication of a second schema 222, an indication of a second vendor ID 223, an indication of a second key ID 224, an indication of a second UUID 225, an indication of a time stamp 226, or an indication of a second digital signature 227. The indication of the second type 221 may be the same as or different from the indication of the first type 211. For example, the data and the additional data may be intended for verification by different entities, stored in different formats, or the like.

The indication of the first schema 212 may be different from the indication of the second schema 222. In an example, the multiple schemas may allow for compatibility with multiple verifying entities. For example, a verifying entity able to read multiple schemas may verify the most recent of the schemas. A verifying entity that is not able to read multiple schemas may verify the schema that it is able to read. Accordingly, the schema can be updated while maintaining backwards compatibility with verifying entities that have not been or cannot be updated with the new schema.

The indication of the second vendor ID 223, the indication of the second key ID 224, and the indication of the second UUID 225 may be the same as or different from the indication of the first vendor ID 213, the indication of the first key ID 214, and the indication of the first UUID 215 respectively. For example, the second schema may specify a different format, size, or the like than the first schema for some or all of the data. Alternatively, or in addition, there may be substantive changes to the vendor ID, key ID, or UUID. For example, the process for generating the digital signature or the process for generating the UUID may change, so the vendor ID, key ID, or UUID may also need to change. The second schema may include additional fields not in the first schema, such as an indication of a time stamp 226. The additional data may include an indication of a second digital signature 227. The second digital signature may be computed over the second type, the second schema, the second vendor ID, the second key ID, the second UUID, and the time stamp. The second digital signature will likely be different from the first digital signature based on the properties of digital signatures. In addition, the format, size, etc. of the second digital signature or the process to generate the second digital signature may be different from that for the first digital signature.

The authenticatable manufactured product 200 may include a communication interface 230. The communication interface 230 may receive requests for the data corresponding to the first schema or the data corresponding to the second schema, and the communication interface 230 may return the data or the additional data in response to the requests. The non-transitory computer-readable medium 210 may store the data or the additional data in any format. For example, the non-transitory computer-readable medium 210 may store the data or the additional data in a first format, and the communication interface 230 may output the data or the additional data in a second format. The non-transitory computer-readable medium 210 or the communication interface 230 may convert the data or the additional data from the first format to the second format. In some examples, the non-transitory computer-readable medium 210 or the communication interface 230 may store some of the data or additional data in logic (e.g., in the layout of the logic). For example, the logic may completely store the data or the additional data, or the logic may convert the data or additional data from an incomplete format to a format that includes all information necessary to verify the digital signature.

Figure 3:
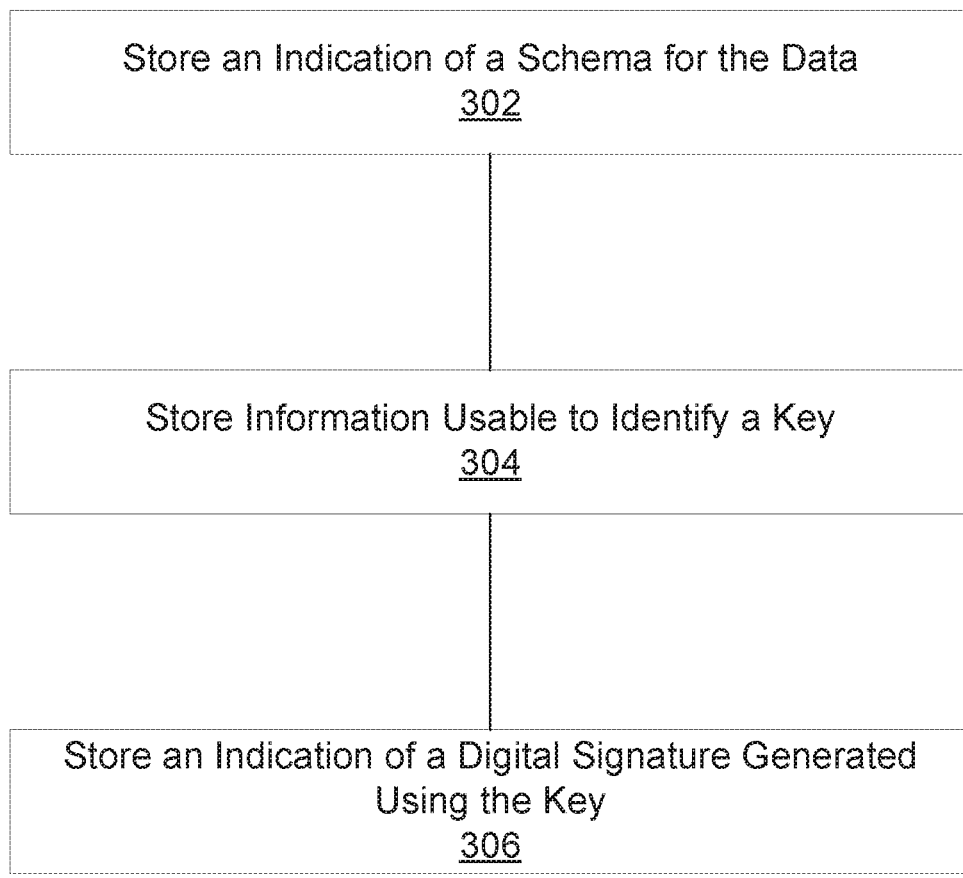
FIG. 3 is a flow diagram of an example method to produce a non-transitory computer-readable medium usable to authenticate a manufactured product.

FIG. 3 is a flow diagram of an example method 300 to produce a non-transitory computer-readable medium usable to authenticate a manufactured product. A processor may perform the method 300. At block 302, the method 300 may include storing an indication of a schema for data. The data may be usable to authenticate the manufactured product, and the schema may describe the layout of the data usable to authenticate the manufactured product. The indication of the schema may be stored in the non-transitory computer-readable medium. As used herein, the term "storing" refers to modifying the non-transitory computer-readable medium to contain information content. For example, storing may include changing properties of the non-transitory computer-readable medium, modifying connections or inputs among logical devices in the non-transitory computer-readable medium, fabricating logical devices in the non-transitory computer-readable medium, or the like.

At block 304, the method 300 may include storing information usable to identify a key in the non-transitory computer-readable medium. In some examples, the information usable to identify the key may not include the key but rather may include information usable to look up a key. At block 306, the method 300 may include storing an indication of a digital signature verifiable using the key in the non-transitory computer-readable medium. The digital signature may be usable to authenticate an indication of a type of the data, the indication of the schema, and the information usable to identify the key. For example, the digital signature may be computed based on the indication of the type, the indication of the schema, and the information usable to identify the key. The digital signature may be authenticated based on the identified key. The indication of the type of data may provide domain separation for the data. Referring to FIG. 1, storing the indication of the schema, the information usable to identify the key, and the indication of the digital signature may include storing the indication of the schema, the information usable to identify the key, and indication of the digital signature in the non-transitory computer-readable medium 110, for example.

Figure 4:
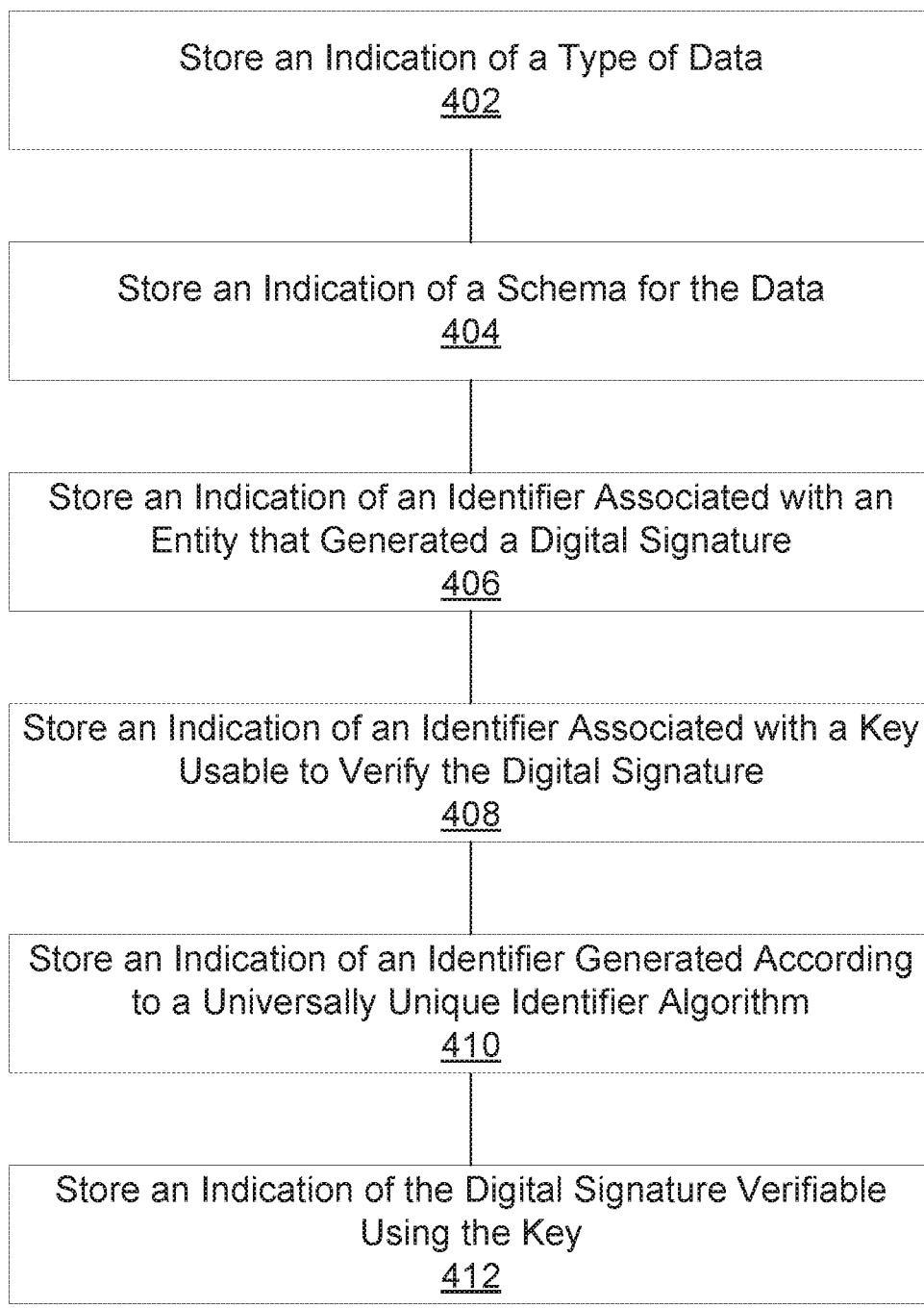
FIG. 4 is a flow diagram of another example method to produce a non-transitory computer-readable medium usable to authenticate a manufactured product.

FIG. 4 is a flow diagram of another example method 400 to produce a non-transitory computer-readable medium usable to authenticate a manufactured product. A processor may perform the method 400. At block 402, the method 400 may include storing an indication of a type of data usable to authenticate the manufactured product. The type of data may provide domain separation. For example, the type of data may indicate a type of product, an intended use for the data, such as which entity is to use the data to authenticate the manufactured product, or the like. The type of data may prevent data from one domain being used in another domain. In some examples, an entity verifying the authenticity of the manufactured product may determine based on the type which of a plurality of sets of data it should use to verify the authenticity of the manufactured product. In the illustrated example, the indication of the type of the data is stored, but it may not be stored in other examples.

At block 404, the method 400 may include storing an indication of a schema for the data 404. For example, storing the indication of the schema may include storing an indication of an identifier usable to retrieve the schema. The verifying entity may look up the schema based on the indication of the identifier. In an example, the verifying entity may determine whether it is able to verify the data based on whether the indication of the identifier corresponds to a stored schema. The verifying entity may use the schema to decode the remainder of the data.

At block 406, the method 400 may include storing an indication of an identifier associated with an entity that generated a digital signature. In an example, a central authority or an entity that verifies digital signatures may assign identifiers to any entities permitted to generate digital signatures. For example, each generating entity may be assigned a unique identifier. The generating entity may be an entity that manufactures the manufactured product, an entity storing data in the non-transitory computer-readable medium, a third party, or the like.

At block 408, the method 400 may include storing an indication of an identifier associated with a key usable to verify the digital signature. In some example, the generating entity may use different keys for different manufactured products or different groups of manufactured products. Accordingly, the identifier associated with the key may indicate which particular key can be used to verify this particular digital signature. For example, the verifying entity may store keys usable to verify digital signatures. The stored keys may be associated with the identifier associated with the generating entity and the identifier associated with the key. The generating entity may provide the identifier associated with the generating entity, the identifier associated with the key, or the key to the verifying entity in advance of the verifying entity authenticating the manufactured product. The verifying entity may use the identifier associated with the generating entity and the identifier associated with the key to look up the correct key and verify the digital signature with that key. The key may be symmetric, and the identifier may be associated with the key used to generate and usable to verify the digital signature. Alternatively, the key may be asymmetric, and the identifier may be associated with a public key usable to verify the digital signature. The public key may be mathematically related to a private key used to generate the digital signature.

At block 410, the method 400 may include storing an indication of an identifier generated according to a universally unique identifier generation process. For example, the universally unique identifier may be generated by an entity that manufactures the manufactured product, an entity storing data in the non-transitory computer-readable medium, a third party, or the like. The universally unique identifier generation process may select the identifier randomly or pseudorandomly from a number space large enough that collisions are unlikely to occur. Each manufactured product may or may not include a unique identifier. In some examples, multiple manufactured products may include the same identifier generated according to the universally unique identifier generation process.

At block 412, the method 400 may include storing a digital signature verifiable using the key. The digital signature may be usable to authenticate the manufactured product. For example, the digital signature may be consistent with the type, the schema, the identifier associated with the generating entity, the identifier associated with the key, and the identifier generated according to the universally unique identifier generation process. It may be computationally difficult to generate a consistent digital signature without access to the key (e.g., for a symmetric digital signature) or a related key (e.g., for an asymmetric digital signature). Accordingly, the verifying entity may confirm the manufactured product is authentic by verifying the digital signature is consistent the type, the schema, the identifier associated with the generating entity, the identifier associated with the key, the identifier generated according to the universally unique identifier generation process, or the like.

In some examples, storing any of the aforementioned indications may include copying the indications from another non-transitory computer-readable medium or manufactured product. Accordingly, multiple manufactured products may contain identical information. For example, even the identifier generated according to the universally unique identifier generation process and the digital signature may not be unique. When copying the indications, the format of the indications may be changed. For example, a first manufactured product may include the indications in a first format, but a second manufactured product may include the same indications in a second format different from the first format.

The indications may be stored in a first format, but the indications may be converted to a second format before being output from the non-transitory computer-readable medium. For example, the non-transitory computer-readable medium may include logic. Storing the indications may include programming the logic to convert the indications from the first format to the second format or fabricating logic to convert the indication from the first format to the second format. In some examples, the indications may be stored entirely in the configuration of the logic, but the logic may appear to anything interfacing with the logic as though the logic is a storage device. In an example, the indications of the type of data, the schema for the data, the identifier associated with the generating entity, the identifier associated with the key, the identifier generated according to the universally unique identifier generation process, and the digital signature may be stored in the non-transitory computer-readable medium 210 of FIG. 2.

Figure 5:
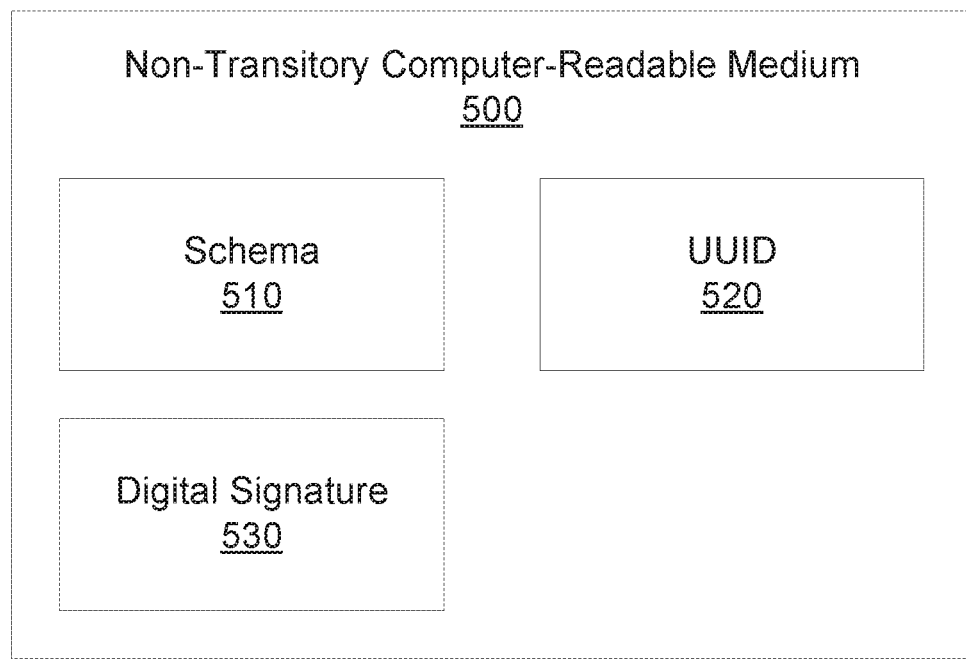
FIG. 5 is a block diagram of an example non-transitory computer-readable medium to store digitally signed information usable to authenticate a manufactured product.

FIG. 5 is a block diagram of an example non-transitory computer-readable medium 500 to store digitally signed information usable to authenticate a manufactured product. The non-transitory computer-readable medium 500 may include data. The data may be stored in the non-transitory computer-readable medium 500 as a set of bits or may be contained in the configuration of logic in the non-transitory computer-readable medium 500. The data may include an indication of a schema for the data 510. The schema may allow an entity that is to verify the authenticity of the manufactured product to determine whether that entity is able to understand the data.

The data may also include an indication of an identifier generated according to a universally unique identifier generation process 520. The identifier generated according to the universally unique identifier generation process may be referred to as a UUID. The UUID may have been generated outside of the non-transitory computer-readable medium 500. Indeed, the UUID may have been copied between several non-transitory computer-readable media. In some examples, several manufactured products may have identical UUIDs, and the UUIDs may not be unique. The data may include an indication of a digital signature 530. The digital signature may be usable to authenticate the data. For example, the digital signature may be generated based on a type of the data, the schema, the UUID, or the like. The digital signature may not authenticate correctly if the schema, UUID, or the like has been modified. The type of the data may provide domain separation. In an example, the non-transitory computer-readable medium 110 of FIG. 1 may comprise the non-transitory computer-readable medium 500, and the manufactured product may be the authenticatable manufactured product 100.

Figure 6:
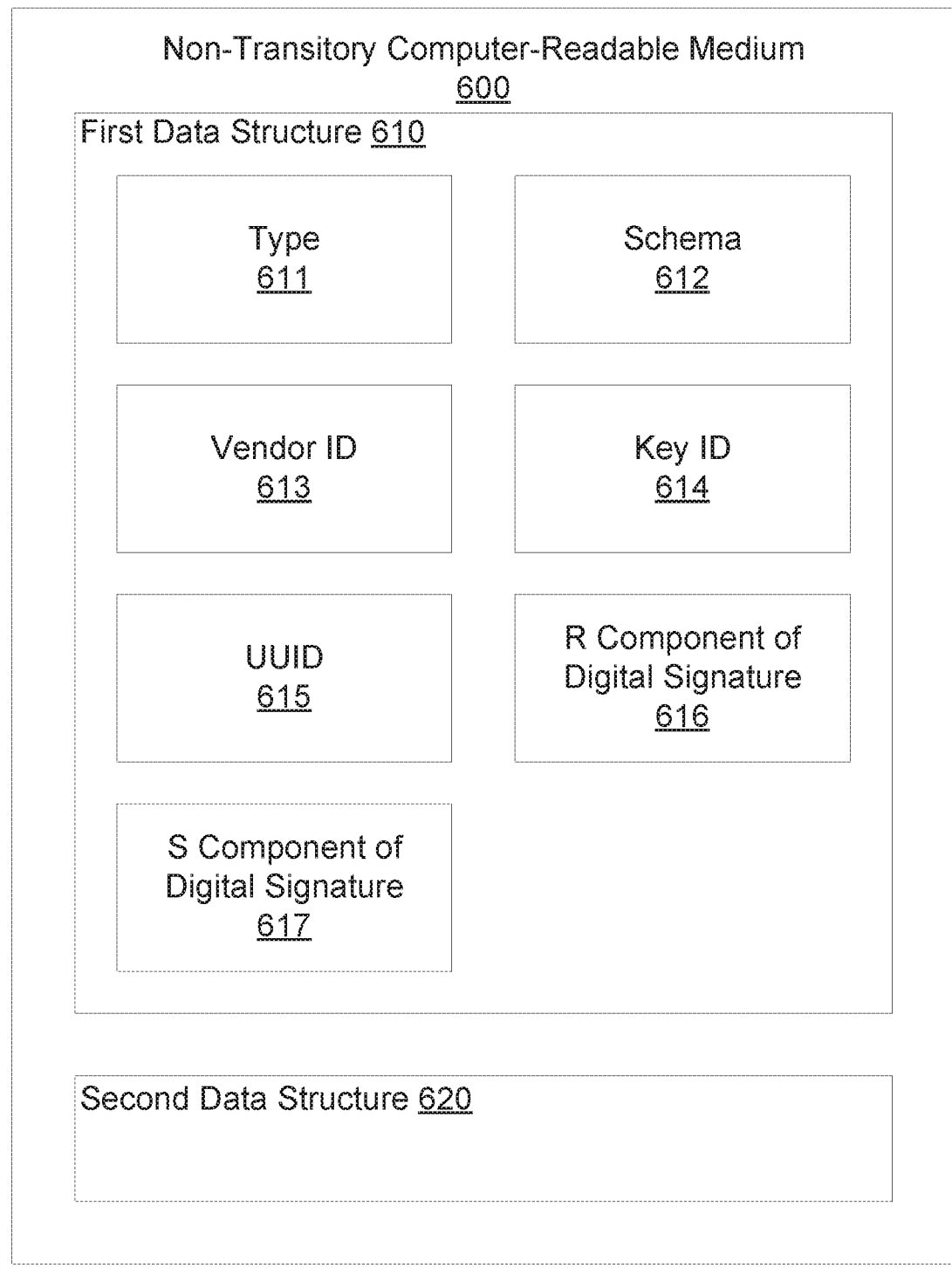
FIG. 6 is a block diagram of another example non-transitory computer-readable medium to store digitally signed information usable to authenticate a manufactured product.

FIG. 6 is a block diagram of another example non-transitory computer-readable medium 600 to store digitally signed information usable to authenticate a manufactured product. The non-transitory computer-readable medium 600 may include data. For example, the non-transitory computer-readable medium 600 may include an indication of a first data structure 610 and an indication of a second data structure 620. The data may be stored in the non-transitory computer-readable medium 600 as a set of bits or may be contained in the configuration of logic in the non-transitory computer-readable medium 600. The indication of the first data structure 610 may include an indication of a type of data 611 in the first data structure. The type may provide domain separation. The type may prevent reuse or collision among data structures for different domains. The type may indicate a type of product to be authenticated, specify an intended use for the first data structure, or the like. In an example, the type may correspond to an entity that is to authenticate a manufactured product associated with the non-transitory computer-readable medium 600 (e.g., a computer system that directly interfaces with the manufactured product, a manufacturer of the manufactured product or the computer system, a third party, etc.). In some examples, the indication of the second data structure 620 may include an indication of the type of data in the second data structure. The indication of the type of data may or may not be the same in the first and second data structures. For example, the first and second data structures may be intended for verification by the same or different entities.

The indication of the first data structure 610 may include an indication of a schema 612 for the first data structure. The schema may be for the entirety of the first data structure or just for the data fields that come after the schema. In some examples, the indication of the schema 612 may be an identifier usable to look up the schema. The indication of the second data structure 620 may include an indication of a schema for the second data structure. The schemas for the first and second data structures may or may not be the same as each other. For example, the first and second data structures may include different schemas if the first data structure or the second data structure is included to provide backward compatibility with a verifying entity that is unable to read some schemas.

The indication of the first data structure 610 may include an indication of an identifier associated with an entity that generated the digital signature, which may be referred to as an indication of a vendor ID 613, and an indication of an identifier associated with a key that generated the digital signature, which may be referred to as an indication of a key ID 614. The vendor ID and the key ID may be usable by the verifying entity to determine which key to use to verify the digital signature. In some examples, the indication of the second data structure 620 may also include an indication of a vendor ID and an indication of a key ID. The indication of the vendor ID and the indication of the key ID may be the same as or different from each other in the two data structures. For example, the first and second data structures may be digitally signed with the same key or with different keys.

The indication of the first data structure 610 may include an indication of an identifier generated according to a universally unique identifier generation process, which may be referred to as an indication of a UUID 615. The universally unique identifier generation process may allow manufacturers to select identifiers randomly or pseudorandomly with a very low probability of two manufacturers selecting the same identifier. Accordingly, the UUID may be unique for authentic manufactured products but not for products that have not been authorized. The UUID may be copied among a plurality of non-transitory computer-readable media, so the UUID may not be unique even though it was generated at some point by a universally unique identifier generation process. In some examples, the indication of the second data structure 620 may include a UUID, which may or may not be the same as the UUID in the first data structure.

The indication of the first data structure 610 may include an indication of an R component of the digital signature 616 and an indication of an S component of the digital signature 617. For example, the digital signature may be generated according to the DSA, which may produce a digital signature with an S component and an R component. The R and S components of the digital signature may be used together by the verifying entity to verify that the digital signature is consistent with the first data structure. The digital signature may allow the verifying entity to confirm that the data in the first data structure has not been modified. The indication of the second data structure 620 may include an indication of a digital signature. The digital signatures in the first and second data structure may be the same as or different from each other. The digital signatures may have the property that small changes in the data being signed result in large changes in the digital signatures, so it may be unlikely that the digital signature are the same if there any differences in the rest of the data in the data structures.

EXAMPLES

Example 1 is a manufactured product. The manufactured product includes a non-transitory computer readable medium or logic. The manufactured product includes a communication interface. The communication interface outputs data derived from the non-transitory computer readable medium or logic. The data includes an indication of a schema for the data, an indication of an identifier, and an indication of a digital signature usable to authenticate a type of the data, the schema, and the identifier.

Example 2 is a manufactured product. The manufactured product includes a non-transitory computer readable medium or logic that includes data. The data includes an indication of a schema for the data, and an indication of an identifier. The manufactured product includes logic to calculate a digital signature based on a type of the data, the schema, and the identifier. The manufactured product includes a communication interface to output the data and the digital signature.

In example 3, the indication of the identifier of any of examples 1-2 includes an indication of an identifier associated with an entity that generated the digital signature.

In example 4, the indication of the identifier of any of examples 1-3 includes an indication of an identifier associated with a key that generated the digital signature.

In example 5, the indication of the identifier of any of examples 1-4 includes an indication of an identifier generated according to a universally unique identifier generation process.

In example 6, the data of any of examples 1-5 includes a first data structure having a first schema and a second data structure having a second schema.

In example 7, the data of any of examples 1-6 does not include an indication of the type of the data. The digital signature is computed based on the type and the data. The type provides domain separation.

In example 8, the data of any of examples 1-6 includes an indication of the type of the data. The digital signature is computed based on the data. The type provides domain separation.

Example 9 is the non-transitory computer readable medium of any of examples 1-8.

Example 10 is a method. The method includes storing the data of any of examples 1-9 in the non-transitory computer readable medium.

In example 11, the storing of example 10 includes copying the data from another non-transitory computer-readable medium.

In example 12, the storing of any of examples 10-11 includes storing the data in a first format and programming logic to output the data in a second format.

In example 13, the non-transitory computer-readable medium of any of examples 1-12 includes a storage medium.

Example 14 is a method. The method includes programming the logic of any of examples 1-8 to produce the data.

In example 15, the method of example 14 includes reading the data from another non-transitory computer-readable medium.

In example 16, the manufactured product of any of examples 1-15 is a print supply.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A print supply comprising:
   a non-transitory computer-readable medium comprising data, readable by a verifying entity, the data including:
      an indication of a schema for the data, wherein the indication of the schema is a value that corresponds to one of a plurality of predefined schemas, wherein the schema is variable in different versions of the print supply and specifies a layout and a size of the data, and wherein the layout and compatibility of the data is determinable by looking up a stored predefined schema according to the indication of the schema,
      an indication of an identifier, and
      an indication of a digital signature usable to authenticate a type of the data, the schema, and the identifier; and
   a communication interface to output the data from the non-transitory computer-readable medium.

2. The print supply of claim 1, wherein the indication of the identifier comprises an indication of an identifier associated with an entity that generated the digital signature and an indication of an identifier associated with a key that generated the digital signature.

3. The print supply of claim 2, wherein the indication of the identifier comprises an indication of an identifier generated according to a universally unique identifier generation process.

4. The print supply of claim 2, wherein the key is an asymmetric key.

5. The print supply of claim 1, wherein the data includes a first data structure having a first schema and a second data structure having a second schema.

6. The print supply of claim 1, wherein the non-transitory computer-readable medium does not include an indication of the type of the data, wherein the digital signature is computed based on the type in combination with the data, and wherein the type provides domain separation.

7. The print supply of claim 1, wherein:
a first data structure comprises the indication of the schema, the indication of the identifier, and the indication of the digital signature; and
the non-transitory computer-readable medium further comprises a second data structure that comprises an indication of another schema, an indication of another identifier, and an indication of another digital signature.

8. The print supply of claim 1, wherein:
the data further includes an indication of a type of the data; and
the type of the data indicates:
a type of print supply; and
an entity which is to use the data to authenticate the print supply.

9. The print supply of claim 1, wherein the indications are stored in a first format and output via the communication interface in a second format.

10. A non-transitory computer-readable medium, readable by a verifying entity, comprising:
an indication of a schema for data included in the non-transitory computer-readable medium, wherein the indication of the schema is a value that corresponds to one of a plurality of predefined schemas, wherein the schema is variable in different versions of a print supply and specifies a layout and a size of the data, and wherein the layout and compatibility of the data is determinable by looking up a stored predefined schema according to the indication of the schema;
an indication of an identifier generated according to a universally unique identifier generation process; and
an indication of a digital signature usable to authenticate a type of the data, the schema, and the identifier.

11. The non-transitory computer-readable medium of claim 10, wherein a first data structure comprises the indication of the schema, the indication of the identifier, and the indication of the digital signature, and wherein the non-transitory computer-readable medium further comprises a second data structure that comprises an indication of another schema.

12. The non-transitory computer-readable medium of claim 11, wherein the second data structure includes an indication of another digital signature.

13. The non-transitory computer-readable medium of claim 11, wherein the second data structure includes the indication of the identifier generated according to the universally unique identifier generation process.

14. The non-transitory computer-readable medium of claim 10, further comprising an indication of an identifier associated with an entity that generated the digital signature and an indication of an identifier associated with a key that generated the digital signature.

15. A method comprising:
storing, in a non-transitory computer-readable medium, an indication of a schema for data, wherein the indication of the schema is a value that corresponds to one of a plurality of predefined schemas, wherein the schema is variable in different versions of a print supply and specifies a layout and size of the data;
storing, in the non-transitory computer-readable medium, information usable to identify a key;
storing, in the non-transitory computer-readable medium, an indication of a digital signature verifiable using the key, the digital signature which is to authenticate a type of the data, the schema, and the information usable to identify the key; and
determining, by a verifying entity, the layout and compatibility of the data by looking up a stored predefined schema according to the indication of the schema.

16. The method of claim 15, wherein storing the information usable to identify the key comprises storing an indication of an identifier associated with an entity that generated the digital signature and storing an indication of an identifier associated with a key usable to verify the digital signature.

17. The method of claim 16, further comprising storing an indication of an identifier generated according to a universally unique identifier generation process.

18. The method of claim 15, wherein storing the information usable to identify the key and storing the indication of the digital signature comprises copying the information usable to identify the key and the indication of the digital signature from another non-transitory computer-readable medium.

19. The method of claim 15, wherein storing at least one of the indication of the schema for the data, the information usable to identify the key, and the indication of the digital signature comprises storing, in a first format, the at least one of the indication of the schema for the data, the information usable to identify the key, and the indication of the digital signature and programming logic to output, in a second format, the at least one of the indication of the schema for the data, the information usable to identify the key, and the indication of the digital signature.

20. The method of claim 15, further comprising copying the indications from another non-transitory computer-readable medium, wherein a format of copied indications is changed from a first format to a second format.

* * * * *